US009122266B2

(12) United States Patent
Franke et al.

(10) Patent No.: US 9,122,266 B2
(45) Date of Patent: Sep. 1, 2015

(54) CAMERA-BASED MONITORING OF MACHINES WITH MOBILE MACHINE ELEMENTS FOR COLLISION PREVENTION

(75) Inventors: Andre Franke, Dortmund (DE); Lars Krueger, Ulm (DE); Christian Woehler, Heroldstatt (DE)

(73) Assignee: PILZ GMBH & CO. KG, Ostfildern (DE)

( * ) Notice: Subject to any disclaimer, the term of this patent is extended or adjusted under 35 U.S.C. 154(b) by 1173 days.

(21) Appl. No.: 12/362,733

(22) Filed: Jan. 30, 2009

(65) Prior Publication Data

US 2009/0222134 A1 Sep. 3, 2009

Related U.S. Application Data

(63) Continuation of application No. PCT/EP2007/006584, filed on Jul. 25, 2007.

(30) Foreign Application Priority Data

Jul. 31, 2006 (DE) .......................... 10 2006 035 934
Oct. 10, 2006 (DE) .......................... 10 2006 048 163

(51) Int. Cl.
*G05B 19/4061* (2006.01)

(52) U.S. Cl.
CPC .. *G05B 19/4061* (2013.01); *G05B 2219/39098* (2013.01); *G05B 2219/49137* (2013.01)

(58) Field of Classification Search
CPC ... B25J 9/1666; G05B 19/058; G05B 19/427; G05B 19/4061; G05B 2219/37388; G05B 2219/39083; G05B 2219/39098; G05B 2219/49137
USPC ........................... 700/251, 255; 901/2, 46, 49
See application file for complete search history.

(56) References Cited

U.S. PATENT DOCUMENTS

| 2003/0076224 | A1 | 4/2003 | Braune |
| 2006/0040792 | A1* | 2/2006 | Muneta ............................. 482/8 |
| 2006/0056655 | A1* | 3/2006 | Wen et al. ..................... 382/103 |

FOREIGN PATENT DOCUMENTS

| DE | 41 15 846 A1 | 11/1992 |
| DE | 198 43 602 A1 | 5/1999 |
| DE | 102 26 140 A1 | 1/2004 |
| DE | 103 58 770 A1 | 8/2004 |
| DE | 103 24 627 A1 | 1/2005 |
| JP | 7-314378 | 12/1995 |
| JP | 11-188687 | 7/1999 |
| JP | 2003-222295 | 8/2003 |
| JP | 2004-12429 | 1/2004 |
| JP | 2004-306863 | 11/2004 |
| WO | WO 2004/029659 | 4/2004 |

OTHER PUBLICATIONS

Uwe Franke et al; 6D-Vision: Fusion of Stereo and Motion for Robust Environment Perception; 2005; pp. 216-223.

* cited by examiner

*Primary Examiner* — John Q Nguyen
*Assistant Examiner* — Kyung Kim
(74) *Attorney, Agent, or Firm* — Harness, Dickey & Pierce, P.L.C.

(57) ABSTRACT

In a method for collision-free interaction between a machine having mobile machine elements and objects in its vicinity, safety regions are established and monitored using the knowledge of the current position and the dynamic behavior. In particular, image data of the mobile machine element are recorded by means of an image acquisition system and are correlated with a database compiled in a training phase with image data of at least one mobile machine element. The database contains image data relating to a plurality of movement phases within the movement process of the machine. Using the database, both the current position of the mobile machine element is ascertained and a future position, reachable within the stopping time, is estimated. The dynamic behavior of the machine in the event of collision risk is optimized on the basis of this estimation.

12 Claims, 2 Drawing Sheets

CAMERA-BASED MONITORING OF MACHINES WITH MOBILE MACHINE ELEMENTS FOR COLLISION PREVENTION

CROSSREFERENCES TO RELATED APPLICATIONS

This application is a continuation of international patent application PCT/EP2007/006584 filed on Jul. 25, 2007 designating the U.S., which international patent application has been published in German language as WO 2008/014909 A1 and claims priority from German patent applications DE 10 2006 035 934.8 filed on Jul. 31, 2006 and DE 10 2006 048 163.1 filed on Oct. 10, 2006. The entire contents of these prior applications are incorporated herein by reference.

BACKGROUND OF THE INVENTION

The invention relates to a method and a device for camera-based monitoring of machines having mobile machine elements for collision prevention.

Modern industrial robots which move at considerable speeds may cause serious damage both to persons in the vicinity, the robots and to the work-pieces handled by them. This can lead to costly production stoppages. The safety of persons who interact with the automatically operating robots is has to be given the highest priority. In modern industrial robots or other machines with mobile machine elements, the movement of which represents a risk to persons and other objects, protective devices must therefore be used to prevent a collision taking place between the moving machine element and the object. To this end it is usually sufficient to bring the machine to rest before accidental contact takes place. The time from the shutdown command until it is at rest is referred to as the stopping time, and it determines the distance to be kept away from it.

Various sensors and evaluation methods to safeguard machine elements are known from the prior art. The simplest option consists in surrounding the machine with a fixed cage whose entrance (for example a door) is coupled to sensors so that the machine is stopped when the cage is entered. If there is a sufficient distance between the entrance and the moving machine, the latter will already be at rest before a person can come in contact with it.

Light barriers and light curtains which are arranged in the space around a moving machine and which transmit a shutdown signal to the machine when a light beam is interrupted, are widespread, but the design outlay is relatively high since the light emitters and sensors must be aligned accurately with one another.

German published patent application DE 103 58 770 A1 describes a safety system with which a machine and its vicinity can be monitored by a system comprising a plurality of cameras. The spatial position of object points in space can be determined by triangulation from synchronously recorded images. The machine is to be shut down if an amount of points lie in a previously defined volume. In contrast to the use of light barriers and arrays, virtually any volumes can be monitored in this way. Such volumes are static, however, and they can be activated or deactivated merely by program control.

In order for the distance between a person and a moving machine to be configured flexibly, German published patent application DE 102 26 140 A1 proposes to determine the present and prior articulation settings and articulation speeds for each individual robot articulation, and to derive a prediction from this relating to the configuration of a movement path of the robot during the stopping time. When deriving the movement path in the period of the stopping time, knowledge is also employed relating to the maximum speed and maximum negative acceleration of the moving machine components. In order to achieve real-time capability of the system despite the usually large number of parameters to be considered, it is proposed that the current stopping time and therefore the current stopping distance should be ascertained by means of a neural network. The distances between the mobile parts of the robot and persons/objects in its vicinity are recorded by means of sensors and are correlated with the ascertained stopping times or distances, so that a shutdown signal can be generated in the event of a collision risk.

Another safety system for an automatically operating machine is described by German published patent application DE 103 24 627 A1. Safety zones defined around the machine and monitored by sensors fitted on the machine are in this case adapted to the known instantaneous and future movement behavior. In the event that a person enters one of the safety zones, an estimate is made from the direction in which they are looking or from their movement behavior as to whether the entry into a safety zone is intentional or accidental. In the event of intentional entry, which is usually associated with planned intervention by the person with the working machine, the safety zones are modified.

In order to be able to estimate the correct stopping time or dimensioning of the safety zones at any time, in the methods known from the prior art it is necessary to employ data provided by the machine or its control program. This is possible only if the machine has a suitable data interface, via which all data required for dynamically safeguarding the machine are available. Often, however, such an interface is not available.

SUMMARY OF THE INVENTION

In view of the prior art, it is an object of the invention to provide a method and a device for collision-free interaction between a machine having a mobile machine element and an object in its vicinity. More particularly, it is an object to provide such a method and device, which can operate easily integrated in existing machine installations even without full data communication to the machine and its control program.

According to an aspect of the invention, this object is achieved by a method for collision-free interaction between a machine having a machine element moveable through a plurality of movement phases in accordance with a dynamic behavior and an object in the vicinity of the mobile machine element, the machine having a drive for driving the mobile machine element and at least one object sensor for detecting the object, the method comprising the steps of providing an image acquisition system for recording image data of the machine element, providing a database containing reference image data relating to the plurality of movement phases, moving the machine element through the movement phases, providing a stopping time defining a time period required to bring the moving machine element to rest, recording instantaneous image data of the machine element by means of the image acquisition system, correlating the instantaneous image data and the reference image data in order to determine a current position of the moving machine element and in order to estimate a future position of the machine element, wherein the future position is a maximum reachable position within the stopping time, establishing a safety region around the machine element as a function of the estimated future position, detecting any entry of the object into the safety region by means of the at least one object sensor, and controlling the drive in order to modify the dynamic behavior of the machine element whenever an object entry into the safety region is detected.

According to another aspect, this object is achieved by a device for the collision-free interaction between a machine having at least one machine element moveable through a plurality of movement phases and an object in the vicinity of the mobile machine element, the device comprising a first unit for determining a current position of the mobile machine element and for estimating a future position of the machine element, which future position is reachable by the machine element within a stopping time, comprising a second unit for determining at least one safety region as a function of the future position, comprising at least one object sensor for detecting an entry of the object into the safety region, and comprising a third unit for controlling the machine element when entry of the object into the safety region is detected in order to modify a dynamic movement behavior of the machine element, wherein the first unit comprises an image acquisition system for recording image data of the machine element, a database containing reference image data relating to the plurality of movement phases, and a correlator for correlating the instantaneously recorded image data with the reference image data from the database, the reference image data corresponding to the plurality of movement phases, and the correlator being designed to estimate both the current position and the future position of the machine element.

DESCRIPTION OF PREFERRED EMBODIMENTS

In the novel method for collision-free interaction between a machine and objects in its vicinity, knowledge of the current position and the dynamic behavior of the machine is employed. This knowledge, and information about the duration from shutdown until the machine elements are at rest (stopping time), is used in order to estimate future positions of the mobile machine elements which may be reached within this stopping time. In usual standard industrial robots, for example, the maximum speed and the maximum negative acceleration of the first articulation are typically 240 degrees/s and 880 degrees/s$^2$, respectively, which gives a stopping angle of about 33 degrees at maximum speed.

On the basis of this estimate, the size of safety regions around the machine and/or the mobile machine elements is then established. These safety regions are monitored by means of sensors in order to detect entry of an object. If this monitoring of at least one of these safety regions results in the detection of an object entering therein, the drive of the machine and/or of the mobile machine element is controlled so that the dynamic movement behavior of the machine element is modified.

Figure 1:
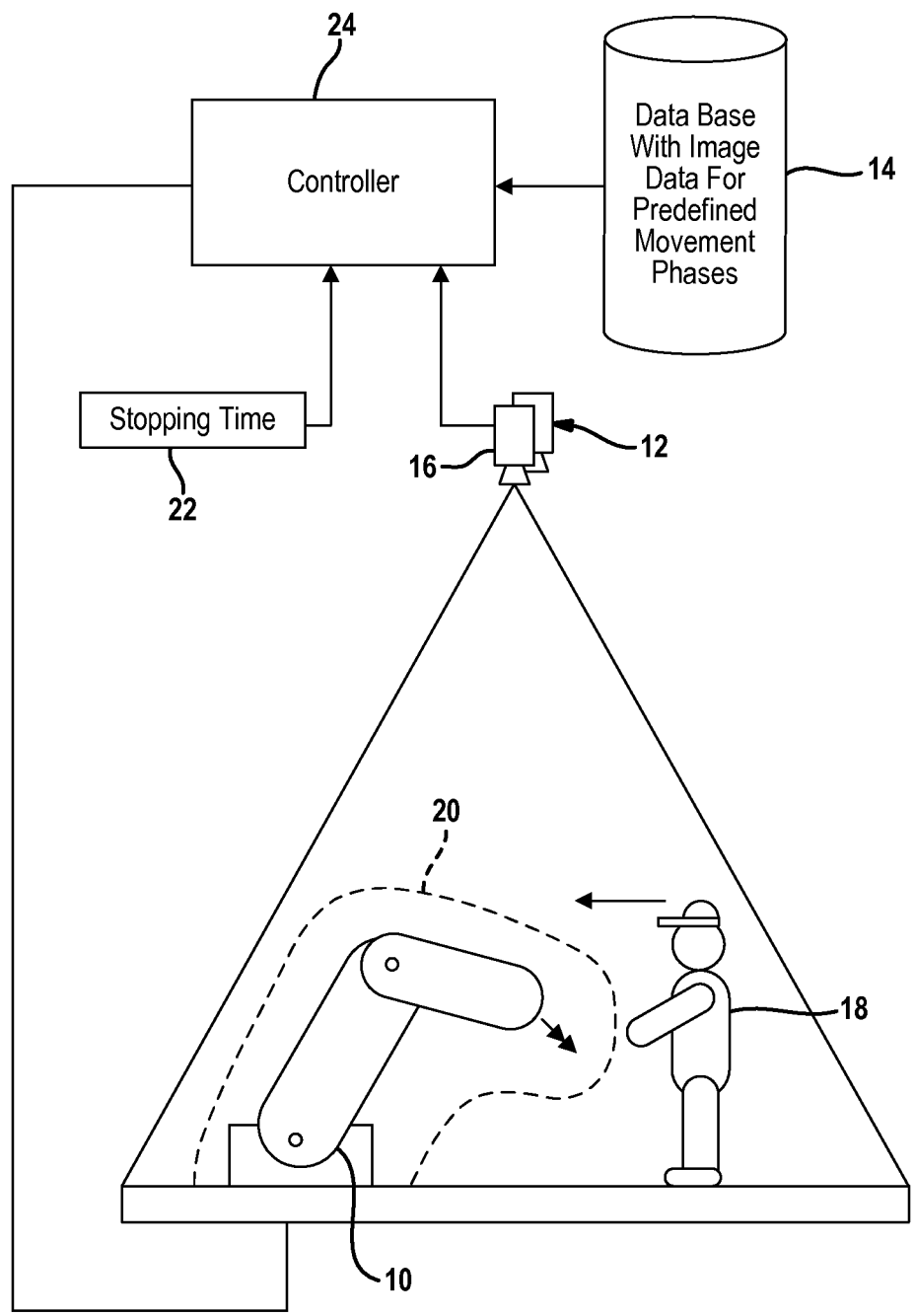
FIG. 1 is a diagrammatical representation of an automated machine installation according to the present invention.

Referring to FIG. 1, image data of the mobile machine elements 10 are advantageously recorded by means of an image acquisition system 12. These image data are correlated with a database 14, which was compiled in a training phase with image data of the machine and/or the at least one mobile machine element 10. In particular, the database contains image data relating both to a plurality of movement phases within the movement process of the mobile machine elements, and relating to the dynamic relationship of this plurality of movement phases. In the scope of correlating the currently recorded image data with this database, both the current position of the mobile machine element (FIG. 1) is ascertained and a future position of the mobile machine elements, reachable within the stopping time, (FIG. 2), is estimated.

Determining the current and future positions from data recorded by means of image sensors and correlating them with a corresponding database advantageously achieves independence from information to be delivered by the machine or its drive. A device operating by means of the method according to the invention is therefore capable of monitoring a machine with mobile machine elements, even if the data provided by the machine are not per se sufficient. The method may therefore be used flexibly with various machines. After a short training phase, during which a database is generated by observing the movement process of a mobile machine element, the method and the novel device can be used for the collision monitoring of any type of machines independently of their control program (whether embodied by software technology or hardware technology).

The image data are preferably recorded by means of a multi-ocular camera system 16. This camera system advantageously has a defined stereo base, which makes it possible to determine distances between the camera system and individual object points in space by means of stereoscopic evaluation methods.

In order to provide a database suitable for the position determination and the estimation of future positions, image data of as many movement phases as possible should be stored in a training phase of the movement process of the machine or of a mobile machine element. In this case, it is possible to ascertain the information of the image data of a movement phase stored in the database by correlating (in particular averaging) a plurality of image data of this movement phase. After this database has been generated, the information from the current image data is then compared with the data stored in the database 14 relating to the movement phases, and the position of the mobile machine element determined as the current position is the one allocated to that movement phase whose information is most similar to the information currently ascertained with the image data.

Besides information derived from the image data of the individual movement phases for determining the current position of at least one mobile machine element 10, the database advantageously also comprises information. relating to the dynamic relationship of this plurality of movement phases of a movement process. By means of the current movement phase, it is possible to find out from the database not only which movement phases follow, but also at what time interval the change between the individual movement phases takes place.

One of the many conceivable advantageous options for ascertaining the current position of a mobile machine element consists in correlating the currently recorded image data with image data stored in the database by means of template matching. The position of the mobile machine element determined as the current position is in this case the one allocated to that movement phase whose stored image has been identified by means of the template matching as most similar to the currently recorded image data.

In another approach, the image data recorded by means of the image acquisition system when compiling the database during the training phase are subjected to a transformation and stored in this form, and are employed for future correlation with the currently recorded image data after a corresponding transformation. The principal axis transformation is particularly advantageously suitable in this case, since the amount of data to be stored in the database or to be correlated can thereby be reduced significantly. Here again, the position of the mobile machine element determined as the current position is the one corresponding to that movement phase whose transformed image has been identified as most similar to the transformation of the currently recorded image data. The locus allocated to a movement phase within multidimensional space during the training phase may be determined, in particular by averaging, from a plurality of mappings or transformations of these mappings of the respective movement phase.

In order to apply a similarity operator in multidimensional space most advantageously, it is recommendable to map the sequence of movement phases by a path through the points respectively allocated to them in multidimensional space. The transformed current image data are then allocated to this movement phase of a moving machine element, the locus of which along the path in multidimensional space is most similar to the currently calculated locus.

Figure 2:
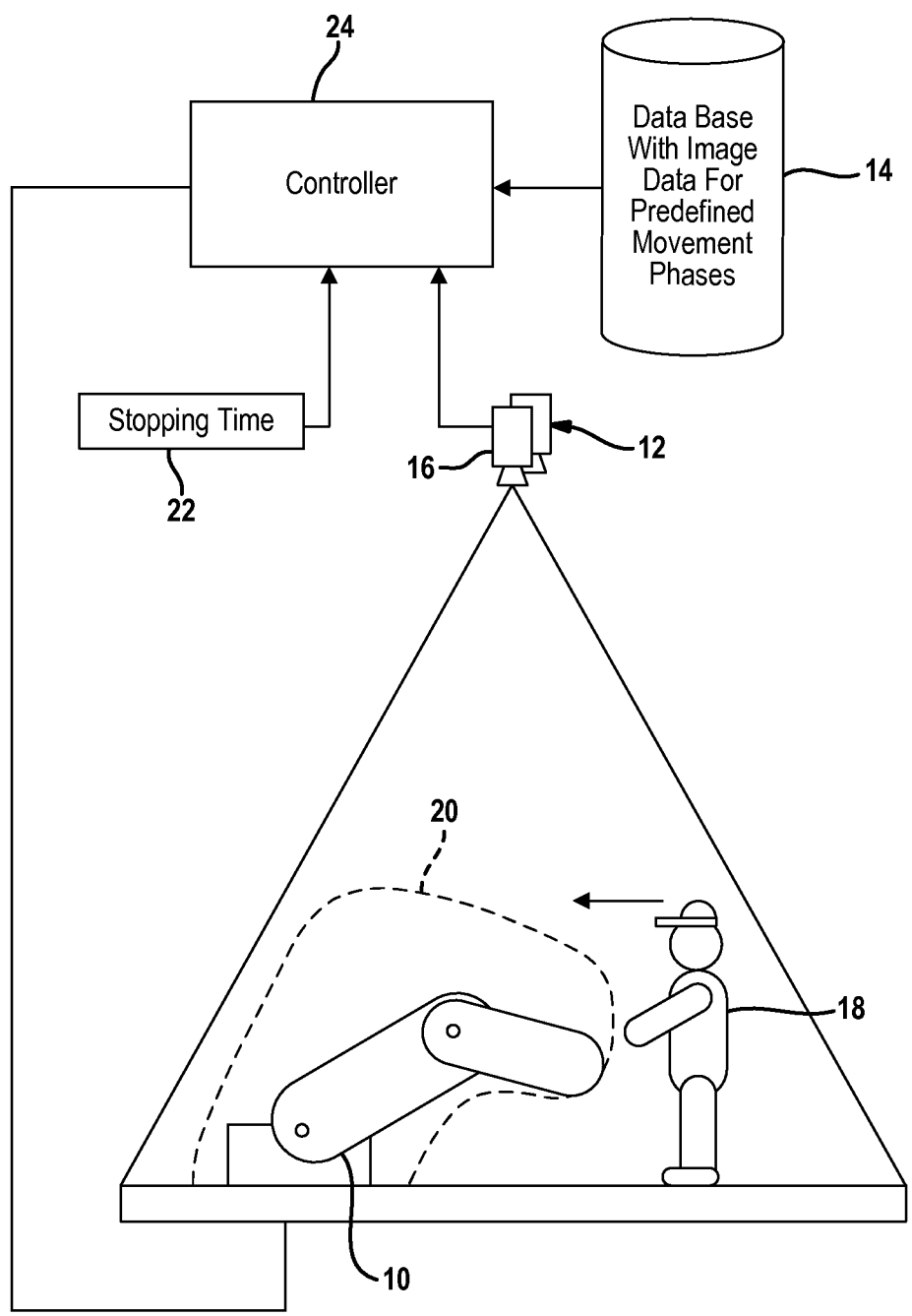
FIG. 2 is a diagrammatical representation of the automated machine installation shown in FIG. 1 with the mobile machine element shown in the future position reachable within the stopping time.

The future position of the mobile machine elements, reachable within the stopping time 22, as illustrated in FIG. 2, may be ascertained best on the basis of the locus of the movement phase determined as the current movement phase by considering the continuation of the path in multidimensional space.

How far a machine element will still move after shutdown may, for example, be derived from a priori knowledge relating to its physical properties. On the other hand, however, it is also possible for this behavior in the event of shutdown to be ascertained experimentally during the training phase of the system, on the basis of a plurality of movement phases already recorded previously by means of image data.

Based on the ascertained current position of the mobile machine element, and using knowledge of the position reachable in the future, the safety region 20 to be allocated to a mobile machine part can be established. To this end, all positions through which the machine elements travel during the stopping time 22 are advantageously determined. On the basis of this, these positions are expanded by a region 20 whose size is defined by a distance that an object potentially existent or detected in the vicinity of the mobile machine element can travel within the stopping time 22. When a person 18 is detected in the vicinity, for example, it is clear that he or she will not move in huge jumps; maximum speeds and accelerations of persons are also well known and if appropriate may also be currently estimated very well in respect of their direction from an additionally performed movement analysis.

It is particularly simple and profitable to dimension the at least one safety region 20 by the positions determined for the movement process during the stopping time being expanded on all sides.

In order to detect an object in one of the safety regions, in particular a person 18, a plurality of very different sensors are suitable, but in particular lidar, radar or ultrasound sensors. A camera sensor may particularly advantageously be used for this. Thus, for example, the image acquisition system 12 used to record the movement process of a mobile machine element may also be used simultaneously to detect entry of an object into at least one of the safety regions.

The moving machine 10 is controlled by a controller 24 which, in the preferred embodiment includes a first unit for determining a current position of the mobile machine element 10 and for estimating a future position of the machine element, which future position is reachable by the machine element within the stopping time 22, a second unit for determining the safety region 20 as a function of the future position, and a third unit for controlling the machine element 10 when entry of the object 18 into the safety region 20 is detected in order to modify a dynamic movement behavior of the machine element 10.

According to the general definition, a collision takes place between two objects whenever they lie in the same region of space at the same time. Collision determination can therefore be carried out very simply by determining the intersection set relating to the spaces occupied by the machine element and the object; if there is such an intersection set, then a collision takes place.

Sensor information converted into 3D image data with movement information is advantageously suitable for the image collision determination, according to the work by Franke et al., (U. Franke, C. Rabe, H. Bardino, S. Gehrig; *6D-Vision: Fusion of Stereo and Motion for Robust Environment Perception*, in Walter G. Kropatsch, Robert Sablatnig, Allan Hanbury (Eds.): Pattern Recognition, 27th DAGM Symposium, Vienna, Austria, Aug. 31-Sep. 2, 2005, Proceedings. Lecture Notes in Computer Science 3663 Springer 2005, pages 216-223) which is incorporated by reference herewith. Each 3D point is in this case allocated a Kalman filter, which predicts its movement. If the predicted paths of a sufficiently large number of 3D points pass through the predefined safety region, then a collision is threatened.

If a collision risk due to the detected entry of an object into at least one of the safety regions is now detected, then the drive of the machine and/or of the mobile machine element is controlled by the controller 24 in order to modify the dynamic movement behavior of the machine element 10. In the simplest case, this modification results in shutting down the movement of the mobile machine element. Yet since the decision relating to a collision is purely binary, in critical cases shutdown sometimes leads to jerky motion of the machine element, especially when for example a person is moving in front of the machine. On the one hand this stresses the mechanics of the machine, and on the other hand it means that its behavior is difficult for a person in its vicinity to comprehend.

In the event of a possible collision, therefore, it is preferable first to modify and in particular slow the movement speed of the moving machine element; this is all the more so when the likelihood of a collision happening is greater. To this end, it is recommendable that the change in the speed should take place proportionally with the estimated probability of an imminent collision. This estimation of the collision probability takes place after detecting the entry of an object into a safety region of the machine, and it describes the probability with which a mobile machine element will actually collide subsequently with the object lying in the safety region.

Since all the quantities relevant to estimating the collision probability are subject to measurement errors, it is preferable for these quantities to be assigned probability densities. Such a method results in relatively small protective regions, since measurements in the less probable regions around the machine lead only to a speed reduction, but not to complete shutdown.

In order to estimate the collision probability, the space passed through by the mobile machine element during the stopping time is preferably subjected to quantization, an individual probability of a collision being determined for each quantization element. The actual collision probability is then derived from the sum of the individual probabilities over all elements.

In order to estimate the collision probability in another variant, all relevant components are assigned probability density functions and these probability density functions are combined together according to Bayes' theorem. To this end the a priori probabilities of a mobile machine element are specified or approximated based on the image data of a training video sequence.

What is claimed is:

1. A method for failsafely controlling an automated machine having a machine element moveable through a plurality of predefined movement phases, the machine having a drive for driving the mobile machine element in accordance with said predefined movement phases and at least one object sensor for detecting an object in the vicinity of the mobile machine element, the method comprising the steps of:
   providing an image acquisition system for acquiring image data of the mobile machine element;
   moving the mobile machine element through the predefined movement phases,
   providing a database containing reference image data acquired by the image acquisition system corresponding to the plurality of predefined movement phases;
   determining a stopping time corresponding to the time period required from a stop command to bring the mobile machine element to rest;
   thereafter monitoring the operation of the automated machine via the image acquisition system by acquiring instantaneous image data of the mobile machine element;
   correlating the instantaneous image data and the reference image data in order to determine a current position of the mobile machine element, wherein the current position is determined as a position allocated to one of said plurality of predefined movement phases whose reference image data is most similar to the instantaneous image data;
   estimating a future position of the mobile machine element relative to the current position of the mobile machine element using the reference image data in the database, wherein the future position is a maximum reachable position from the current position within the stopping time;
   establishing a safety region around the current position of the mobile machine element, wherein a dimension of the safety region is determined as a function of the estimated future position;
   detecting an entry of the object into the safety region by means of the at least one object sensor;
   generating a stop command when an object entry into the safety region is detected; and
   controlling said drive in response to said stop command.

2. The method according to claim 1, wherein the image acquisition system comprises a multi-ocular camera system for acquiring the image data.

3. The method according to claim 1, wherein the current position is determined by identifying reference image data which is most similar to the instantaneous image data, and by determining a movement phase allocated to the identified reference image data.

4. The method according to claim 1, wherein instantaneous image data are subjected to a transformation in order to obtain transformed instantaneous image data, and wherein the current position is determined as a function of the transformed instantaneous image data.

5. The method according to claim 1, wherein the future position of the mobile machine element is estimated by identifying a path of movement along the movement phases.

6. The method according to claim 1, wherein the dimension of the safety region is established by determining a plurality of future positions on the basis of the database, and by expanding the plurality of future positions by a predetermined distance.

7. The method of claim 6, wherein the dimension of the safety region is determined as a function of a distance which the object can travel within the stopping time.

8. The method according to claim 7, wherein the future positions are expanded on all sides in order to establish the safety region.

9. The method according to claim 1, wherein the at least one object sensor generates 3D sensor data including movement information of the object.

10. The method of claim 1, wherein the at least one object sensor comprises the image acquisition system used to monitor the operation of the automated machine.

11. A device for failsafely controlling an automated machine having a drive for driving at least one machine element moveable through a plurality of predefined movement phases, the device comprising:
   an image acquisition system for monitoring the operation of the automated machine and acquiring image data of the mobile machine element;
   a database containing reference image data acquired by the image acquisition system corresponding to the plurality of predetermined movement phases of the mobile machine element;
   a first unit for determining a current position of the mobile machine element by correlating instantaneous image data acquired by the image acquisition system of the mobile machine element with the reference image data from the database, wherein the first unit determines the current position of the mobile machine element as a position allocated to a movement phase whose reference image data is most similar to the instantaneous image data;
   a second unit for estimating a future position of the mobile machine element relative to the current position, wherein the future position is the maximum reachable position from the current position within a predetermined stopping time defined as the time period required from a stop command to bring the mobile machine element to rest;
   at least one object sensor for detecting an object in the vicinity of the mobile machine element;
   a third unit for establishing a safety region around the current position of the mobile machine element as a function of the future position; and
   a controller for generating a stop command when said at least one object sensor detects an entry of the object into the safety region and controlling said drive in response to said stop command.

12. The device of claim 11, wherein the at least one object sensor comprises the image acquisition system used to monitor the operation of the automated machine.

* * * * *